(12) United States Patent
He et al.

(10) Patent No.: US 11,275,649 B2
(45) Date of Patent: Mar. 15, 2022

(54) FACILITATING DETECTION OF DATA ERRORS USING EXISTING DATA

(71) Applicant: MICROSOFT TECHNOLOGY LICENSING, LLC, Redmond, WA (US)

(72) Inventors: Yeye He, Redmond, WA (US); Huang Zhipeng, Hong Kong (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 941 days.

(21) Appl. No.: 15/781,063

(22) PCT Filed: Jan. 19, 2018

(86) PCT No.: PCT/CN2018/073495
§ 371 (c)(1),
(2) Date: Jun. 1, 2018

(87) PCT Pub. No.: WO2019/140652
PCT Pub. Date: Jul. 25, 2019

(65) Prior Publication Data
US 2019/0250984 A1    Aug. 15, 2019

(51) Int. Cl.
*G06F 11/00*    (2006.01)
*G06F 11/10*    (2006.01)
*G06F 17/18*    (2006.01)

(52) U.S. Cl.
CPC .......... *G06F 11/1024* (2013.01); *G06F 11/00* (2013.01); *G06F 11/10* (2013.01);
(Continued)

(58) Field of Classification Search
CPC ...... G06F 11/1024; G06F 11/00; G06F 11/10; G06F 11/1048; G06F 11/0769; G06F 17/18; G06F 2201/81
See application file for complete search history.

(56) References Cited

U.S. PATENT DOCUMENTS

2010/0063948 A1*   3/2010   Virkar .................... G06N 3/02
                                                      706/12
2012/0221508 A1*   8/2012   Chaturvedi ............ G06F 16/00
                                                     707/602
(Continued)

FOREIGN PATENT DOCUMENTS

| CN | 1598967 A | 3/2005 |
|---|---|---|
| CN | 104461761 A | 3/2015 |

(Continued)

OTHER PUBLICATIONS

"International Search Report and Written Opinion Issued in PCT Application No. PCT/CN2018/073495", dated Oct. 11, 2018, 8 Pages.

(Continued)

*Primary Examiner* — Joseph D Manoskey
(74) *Attorney, Agent, or Firm* — Shook, Hardy & Bacon L.L.P.

(57) ABSTRACT

Methods, computer systems, computer-storage media, and graphical user interfaces are provided for facilitating data error detection, according to embodiments of the present invention. In one embodiment, a target data set having a plurality of values for which to identify incompatible data is obtained. A pattern for each of the plurality of values is generated using at least one generalization language. A pair of patterns that represent a pair of values is utilized to identify a compatibility indicator that corresponds with a pair of training patterns in a compatibility index that match the pair of patterns. The compatibility indicator indicates the pair of patterns are incompatible with one another based on a statistical analysis performed in association with a corpus of data external to the target data set. An indication that the values are incompatible with one another is provided.

17 Claims, 7 Drawing Sheets

(52) U.S. Cl.
CPC .......... *G06F 11/1048* (2013.01); *G06F 17/18* (2013.01); *G06F 2201/81* (2013.01)

(56) References Cited

U.S. PATENT DOCUMENTS

| 2016/0078367 | A1 | 3/2016 | Adjaoute |
| 2016/0260026 | A1 | 9/2016 | Kloetzer et al. |
| 2016/0350369 | A1* | 12/2016 | He .................... G06F 16/24537 |
| 2019/0156264 | A1* | 5/2019 | Biswas .................. G06Q 30/04 |
| 2020/0126037 | A1* | 4/2020 | Tatituri .................. G06N 20/00 |

FOREIGN PATENT DOCUMENTS

| JP | 2013050836 A | 3/2013 |
| KR | 20070113041 A | 11/2007 |

OTHER PUBLICATIONS

"European Spreadsheet Risks Interest Group—spreadsheet risk management and solutions conference", Retrieved from <<http://www.eusprig.org/horror-stories.htm>>, Retrieved on: Jan. 9, 2018, 16 Pages.

Li, et al., "Regular expression learning for information extraction", In Proceedings of Conference on Empirical Methods in Natural Language Processing, Oct. 25, 2008, 10 Pages.

Lopes, et al., "Functional and approximate dependency mining: database and fca points of view", In Journal of Experimental & Theoretical Articial Intelligence, vol. 14, Issue 2-3, Apr. 2002, pp. 1-25.

Panko, Raymond R., "Spreadsheet Errors: What We Know. What We Think We Can Do", Retrieved From<<https://arxiv.org/abs/0802.3457>>, Feb. 23, 2008, 9 Pages.

Panko, Raymond R., "What we know about spreadsheet errors", In Journal of End User Computing's Special issue on Scaling Up End User Development, vol. 10, No. 2, Apr. 1998, 33 Pages.

Pit-Claudel, et al., "Outlier detection in heterogeneous datasets using automatic tuple expansion", In Technical Report of MIT-CSAIL-TR-2016-002, Feb. 8, 2016, 14 Pages.

Powell, et al., "Errors in operational spreadsheets: A review of the state of the art", In Proceedings of 42nd Hawaii International Conference on System Sciences, Jan. 5, 2009, pp. 1-8.

Raman, et al., "Potter's wheel: An interactive data cleaning system", In Proceedings of 27th International Conference on Very Large Data Bases, Sep. 11, 2001, 10 Pages.

Singh, et al., "Melford: Using Neural Networks to Find Spreadsheet Errors", In Technical Report of MSR-TR-2017-5, Jan. 31, 2017, pp. 1-13.

Wang, et al., "Synthesizing mapping relationships using table corpus", In Proceedings of ACM International Conference on Management of Data, May 14, 2017, 16 Pages.

Wyatt, Allen, "Changing Error Checking Rules", Retrieved From<<https://excelribbon.tips.net/T006221_Changing_Error_Checking_Rules.html>>, May 2, 2015, 2 Pages.

Yu, et al., "Extending Functional Dependency to Detect Abnormal Data in RDF Graphs", In Proceedings of International Semantic Web Conference, Oct. 23, 2011, pp. 1-16.

"Extended European Search Report Issued in European Application No. 18901089.5", dated Aug. 6, 2021, 10 Pages.

Huang, et al., "Auto-Detect: Data-Driven Error Detection in Tables", In Proceedings of the International Conference on Management of Data, May 27, 2018, pp. 1377-1392.

Mitchell, Tom M., "Generalization as Search", In Journal of Artificial Intelligence, vol. 18, Issue 2, Mar. 1, 1982, pp. 203-226.

"Machine Learning Services", Retrieved from<<https://azure.microsoft.com/en-us/services/machine-learning-services/>>, Retrieved Date: Jan. 9, 2018, 7 Pages.

"OpenRefine", Retrieved from<<http://openrefine.org/>>, Retrieved Date: Jan. 9, 2018, 4 Pages.

"Supported Data Types—Trifacta", Retrieved from<<https://docs.trifacta.com/display/PE/Supported+Data+Types>>, Retrieved Date: Jan. 9, 2018, 2 Pages.

"Data Wrangling", Retrieved from<<https://www.trifacta.com/>>, Retrieved Date: Jan. 9, 2018, 8 Pages.

"Trifacta Wrangler", Retrieved from<<https://www.trifacta.com/products/wrangler/>>, Retrieved Date: Jan. 9, 2018, 6 Pages.

Abedjan, et al., "Detecting Data Errors: Where are We and What needs to be Done?", In Proceedings of the VLDB Endowment, vol. 9, Issue 12, Aug. 1, 2016, pp. 993-1004.

Arning, et al., "A Linear Method for Deviation Detection in Large Databases", In Proceedings of the Second International Conference on Knowledge Discovery and Data Mining, Aug. 2, 1996, pp. 164-169.

Bex, et al., "Inference of Concise DTDS from xml Data", In Proceedings of the 32nd International Conference on Very large data bases, Sep. 12, 2006, pp. 115-126.

Bohannon, et al., "Conditional Functional Dependencies for Data Cleaning", In Proceedings of IEEE 23rd International Conference on Data Engineering, Apr. 15, 2007, pp. 746-755.

Chakrabarti, et al., "Data Services Leveraging Bing's Data Assets", In Proceedings of IEEE Computer Society Technical Committee on Data Engineering, vol. 39, Issue 3, Sep. 2016, pp. 1-14.

Chandola, et al., "Outlier Detection: A Survey", In Proceedings of ACM Computing Surveys, Aug. 15, 2007, 83 Pages.

Cheung, et al., "Custodes: Automatic Spreadsheet Cell Clustering and Smell Detection Using Strong and Weak Features", In Proceedings of the 38th International Conference on Software Engineering, May 14, 2016, pp. 464-475.

Chu, et al., "Discovering Denial Constraints", In Proceedings of the VLDB Endowment, vol. 6, Issue 13, Aug. 26, 2013, pp. 1498-1509.

Chu, et al., "Katara: A Data Cleaning System Powered by Knowledge Bases and Crowdsourcing", In Proceedings of the ACM SIGMOD International Conference on Management of Data, May 31, 2015, pp. 1247-1261.

Cormode, et al., "An Improved Data Stream Summary: The Countmin Sketch and its Applications", In Journal of Latin American Symposium on Theoretical Informatics, Apr. 5, 2004, 11 Pages.

Cormode, et al., "Summarizing and Mining Skewed Data Streams", In Proceedings of the SIAM International Conference on Data Mining Society for Industrial and Applied Mathematics, Apr. 21, 2005, 12 Pages.

Cousineau, et al., "Outliers Detection and Treatment: A Review", In International Journal of Psychological Research, vol. 3, Issue 1, Jun. 18, 2015, pp. 58-67.

Fan, et al., "Detecting Errors in Numeric Attributes", In International Conference on Web-Age Information Management, Jun. 16, 2014, 12 Pages.

Gupta, et al., "Outlier Detection for Temporal Data: A survey", In Journal of IEEE Transactions on Knowledge and Data Engineering, vol. 26, Issue 9, Sep. 2014, pp. 2250-2267.

Swinehart, et al., "Forecast Snapshot: Self-Service Data Preparation, Worldwide, 2016", Retrieved from: https://www.gartner.com/doc/3204817/, Feb. 9, 2016, 3 Pages.

He, et al., "An Optimization Model for Outlier Detection in Categorical Data", In Proceedings of International Conference on Intelligent Computing, Aug. 23, 2005, 12 Pages.

Hellerstein, JosephM., "Quantitative Data Cleaning for Large Databases", In Journal of United Nations Economic Commission for Europe (UNECE), Feb. 27, 2008, 42 Pages.

Hodge, et al., "A Survey of Outlier Detection Methodologies", In Journal of Artificial intelligence review, vol. 22, Issue 2, Oct. 1, 2004, 43 Pages.

Ilyas, et al., "Cords: Automatic Discovery of Correlations and Soft Functional Dependencies", In Proceedings of the ACM SIGMOD International conference on Management of data, Jun. 13, 2004, 12 Pages.

Keogh, et al., "Towards Parameter-Free Data Mining", In Proceedings of the tenth ACM SIGKDD international conference on Knowledge discovery and data mining, Aug. 22, 2004, pp. 206-215.

(56) References Cited

OTHER PUBLICATIONS

Khuller, et al., "The Budgeted Maximum Coverage Problem", In Journal of Information Processing Letters, vol. 70, Issue 1, Apr. 1999, pp. 1-8.

* cited by examiner

| | |
|---|---|
| CAPT Thomas K. Chadwick | 1992 |
| CAPT Skip Blancett | 1995 |
| CAPT Leroy Gilbert | 1998 |
| CAPT Wilbur C. Douglass, III | 2002 |
| CAPT William F. Cuddy, Jr. | 2006 |
| CAPT Gary P. Weeden | June 11, 2010 |

FACILITATING DETECTION OF DATA ERRORS USING EXISTING DATA

CROSS-REFERENCE TO RELATED APPLICATIONS

This application is a National Stage entry of and claims priority under 35 U.S.C. § 371 to International Application No. PCT/CN2018/073495, filed on Jan. 19, 2018, entitled "Facilitating Detection of Data Errors Using Existing Data," the entirety of which is incorporated by reference herein.

BACKGROUND

Data analysts oftentimes desire to identify data errors within a set of data values. For example, data may be collected in a format or variation that is not compatible with the other data. To effectively analyze or consume the data, however, the collected data may be desired to be compatible with one another. For example, compatible data may be desired to effectively perform table searching, data querying, etc. Identifying errors within data, however, is often difficult and error prone. For example, conventional implementations that use regular expression patterns to detect inconsistent values can be error-prone as such techniques make local decisions based only on values in a given input column.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating detection of data errors using existing data external to the data set (e.g., column) being analyzed. In particular, a large corpus of existing data can be utilized to detect co-occurrence statistics. Such statistics can be leveraged to detect errors or incompatibility within a data set, such as a single column of data.

BRIEF DESCRIPTION OF THE DRAWINGS

The technology described herein is described in detail below with reference to the attached drawing figures, wherein:

FIG. 2 is an exemplary graphical user interface associated with detected data error, in accordance with aspects of the technology described herein;

DETAILED DESCRIPTION

Figure 1:
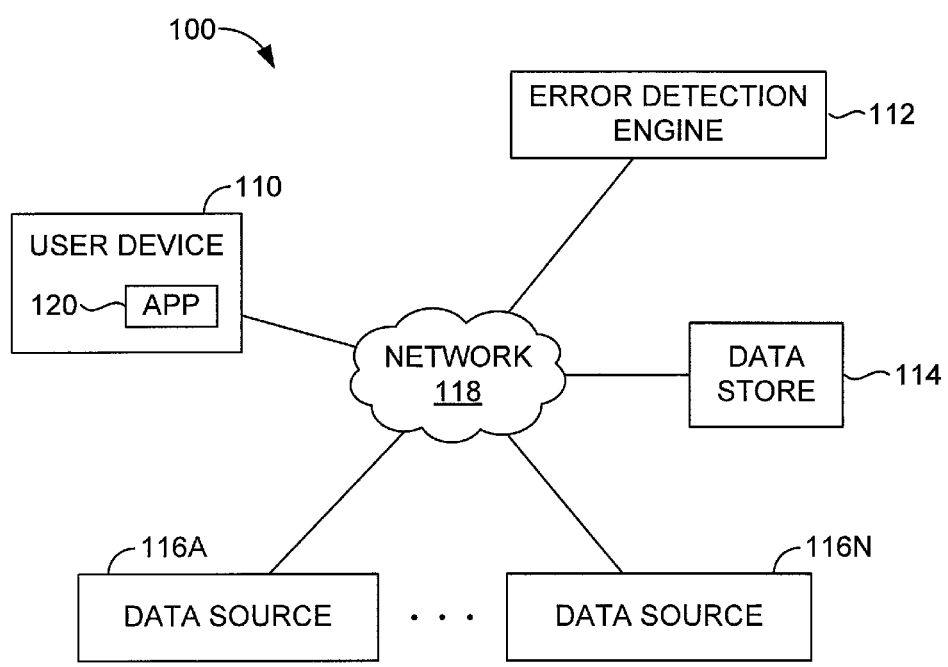
FIG. 1 is a block diagram of an exemplary system for facilitating data error detection, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Various types of data can be collected and/or reported. As one example, types of data collected can include personal information (e.g., name, phone number, address, email address), computer data (e.g., IP address, MAC address), transaction data (e.g., date, time, credit card number, ISBN number), health-related data (e.g., DEA number, drug name), etc. In many cases, the data is not collected in a common format. For example, date information may be collected, but may not be collected in the same format (e.g., July 4, 2018; 7/4/2018; 07.04.18, etc.). Erroneous data, inconsistent data, or incompatible data, however, can present challenges for downstream queries and/or programs. By way of example only, a downstream query or program that produces an aggregate result with a group-by "month" may assume dot-separated data formats, which would extract months by splitting using '.' and taking the second component. Inconsistent date formats (e.g., date formats that are not dot-separated) included in the data set (e.g., column of data), however, can lead to errors or corruption of downstream results.

Recognizing errors or incompatibilities within data, however, can be difficult and error-prone. Many conventional systems limit error detection to manually-defined rules. Utilizing manually-defined rules can be tedious to generate and limited in functionality. Other conventional systems can detect errors only based on values in the same input column. Such an approach, however, is only based on values in the given input column, which can be result in inaccurate error detection.

Accordingly, embodiments of the present disclosure are directed to facilitating automated detection of data error using existing data. In particular, an extensive corpus of existing data can be analyzed to statistically detect incompatibility indicating data error. Such statistical analysis, or portion thereof, can be stored in an index. For instance, an index may include incompatibility indicators that indicate a level or extent of compatibility between data values and/or patterns representing data values. In accordance with receiving an error detection query (e.g., via a user device), target data associated therewith can be analyzed to identify any errors. As described, to detect errors, an error detection engine can analyze the set of target data and utilize a compatibility index to detect erroneous data. In particular, values within the target data can be generalized to patterns using a generalization language(s). Such a pattern can then be used in association with an index to identify erroneous data. For example, a pattern pair representing a value pair in the target data can be used to reference a compatibility indicator in an index that corresponds with a matching pattern pair. Such a compatibility indicator can indicate an extent or measure of compatibility.

Overview of Exemplary Environments for Facilitating Data Error Detection

Referring now to FIG. 1, a block diagram of an exemplary network environment 100 suitable for use in implementing embodiments of the invention is shown. Generally, the system 100 illustrates an environment suitable for facilitating detection of data errors (e.g., erroneous or incompatible data types) by, among other things, using existing data, such as existing data tables. The network environment 100 includes a user device 110, an error detection engine 112, a data store 114, and data sources 116a-116n (referred to generally as data source(s) 116). The user device 110, the error detection engine 112, the data store 114, and the data sources 116a-116n can communicate through a network 118, which may include any number of networks such as, for example, a local area network (LAN), a wide area network (WAN), the Internet, a cellular network, a peer-to-peer (P2P) network, a mobile network, or a combination of networks. The network environment 100 shown in FIG. 1 is an example of one suitable network environment and is not intended to suggest any limitation as to the scope of use or functionality of embodiments of the inventions disclosed throughout this document. Neither should the exemplary network environment 100 be interpreted as having any dependency or requirement related to any single component or combination of components illustrated therein. For example, the user device 110 and data sources 116a-116n may be in communication with the error detection engine 112 via a mobile network or the Internet, and the error detection engine 112 may be in communication with data store 114 via a local area network. Further, although the environment 100 is illustrated with a network, one or more of the components may directly communicate with one another, for example, via HDMI (high-definition multimedia interface), DVI (digital visual interface), etc. Alternatively, one or more components may be integrated with one another, for example, at least a portion of the error detection engine 112 and/or data store 114 may be integrated with the user device 110. For instance, a portion of the error detection engine 312 configured to generate an index (e.g., index manager 316 of FIG. 3) may be integrated with a server in communication with a user device, while the user device may be configured to perform error detection (e.g., via error detection manager 314 of FIG. 3).

The user device 110 can be any kind of computing device capable of facilitating detection of data errors. For example, in an embodiment, the user device 110 can be a computing device such as computing device 700, as described above with reference to FIG. 7. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating a data error detection. In some implementations, the application(s) comprises a web application, which can run in a web browser, and could be hosted at least partially server-side. In addition, or instead, the application(s) can comprise a dedicated application. In some cases, the application is integrated into the operating system (e.g., as a service).

In embodiments, data error detections may be initiated and/or presented via an application 120 operating on the user device 110. In this regard, the user device 110, via an application 120, might allow a user to initiate a data error detection and to obtain, in response to initiating a data error detection, an indication of one or more data values that may be erroneous. The user device 110 can include any type of application that facilitates data error detection. An application may be a stand-alone application, a mobile application, a web application, or the like. One exemplary application that may be used for detecting data errors, or data suggestions associated therewith, includes a spreadsheet application. In some cases, the functionality described herein may be integrated directly with an application or may be an add-on, or plug-in, to an application.

User device 110 can be a client device on a client-side of operating environment 100, while error detection engine 112 can be on a server-side of operating environment 100. Error detection engine 112 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of error detection engine 112 and user device 110 to remain as separate entities.

In an embodiment, the user device 110 is separate and distinct from the error detection engine 112, the data store 114, and the data sources 116 illustrated in FIG. 1. In another embodiment, the user device 110 is integrated with one or more illustrated components. For instance, the user device 110 may incorporate functionality described in relation to the error detection engine 112, such as error detection manager 314. For clarity of explanation, we will describe embodiments in which the user device 110, the error detection engine 112, the data store 114, and the data sources 116 are separate, while understanding that this may not be the case in various configurations contemplated within the present invention.

As described, data error detection refers detection of an error in data, particularly related to an incompatible type or format of data. Error detection is oftentimes desired as quality or compatible data is generally desired within a set of data (e.g., column of data, etc.). For instance, inconsistencies in data, or incompatible data, can result in challenges for downstream queries and programs, which often make implicit assumptions on how data should look. By way of example only, given a table having mixed date formatting, a downstream program or query that produces an aggregate result with a group-by on month may assume dot-separated date formats, which would extract months by splitting using "." and taking a second component in the value. Such utilization, however, may lead to unexpected errors or even corruption of downstream results.

Identification of such error detection may be initiated at the user device 110 in any manner. For instance, upon selection of a set of data (e.g., a column of data), a "begin" or "search" function button might be selected, for example, by a user via the user interface. By way of example only, a user might select to search for erroneous or incompatible data within the set of data. As another example, identification of erroneous or incompatible data might be automatically initiated.

A set of data for which error detection is applied can be selected in any number of ways. For instance, a user might use a mouse, selector, touch input, or the like to specify a column of data. As another example, a set of data might be automatically selected. By way of example only, assume a table includes several columns of data. In such a case, the values in a first column may be selected to detect erroneous data.

A set of data values can be provided as, or as part of, an error detection query to initiate an error detection process. For instance, a set of data values might be included as an error detection query to result in one or more indications of incompatible data. For example, upon selecting a set of data as well as a "begin" or "go" button or icon, the selected data can be provided to the error detection engine 112 for use in detecting erroneous data.

The user device 110 communicates with the error detection engine 112 to facilitate identification of erroneous or incompatible data. In embodiments, for example, a user utilizes the user device 110 to initiate a search for erroneous errors via the network 118. For instance, in some embodiments, the network 118 might be the Internet, and the user device 110 interacts with the error detection engine 112 to obtain indications of predicted data errors, or data suggestions thereof. In other embodiments, for example, the network 118 might be an enterprise network associated with an organization. It should be apparent to those having skill in the relevant arts that any number of other implementation scenarios may be possible as well.

With continued reference to FIG. 1, the error detection engine 112 generally provides indications of predicted data errors. Generally, the error detection engine 112 analyzes a set of data to identify potential data errors. The detected data errors can be provided to the user device 110 and/or used to correct data or provide suggestions related thereto. The error detection engine 112, according to embodiments, can be implemented as server systems, program modules, virtual machines, components of a server or servers, networks, and the like.

In embodiments, the error detection engine 112 receives error detection queries initiated via the user device 210. Error detection queries received from a user device, such as user device 110, can include error detection queries that were manually or explicitly input by the user (input queries) as well as error detection queries that were automatically generated. By way of example, an error detection query might be specified by a user based on the user selecting a set of data, such as a column of data. Error detection queries can additionally or alternatively be automatically generated and received at the error detection engine 112. For instance, upon detecting a new column in a table having one or more data values, an error detection query might be automatically triggered. Generally, the error detection engine 112 can receive error detection queries from any number of devices.

In accordance with receiving an error detection query (e.g., via the user device 110), the error detection engine 112 can analyze the data to identify any errors. As described, to detect errors, the error detection engine 112 may analyze a set of data and utilize a compatibility index to detect erroneous data. In particular, values within a set of data can be generalized to patterns using a generalization language(s). Such a pattern can then be used in association with an index to identify erroneous data.

By way of example only, and with reference to FIG. 2, FIG. 2 illustrates an example user interface 200 associated with a data error notification. As illustrated, column 210 represents various date values. As shown, dates are generally provided in a four-digit year format. However, value 212 includes a month, day and year format (Jun. 11, 2010). As such, a data error notification 214 can be provided to indicate a potential erroneous data format. Such a data error detection notification 214 can be represented in any manner. For example, the data error detection notification may include a suggested data transformation, a request to remove the data, or the like. This is only one example of potential user interface aspects of embodiments of the present invention and is not intended to limit the scope of the invention.

Figure 3:
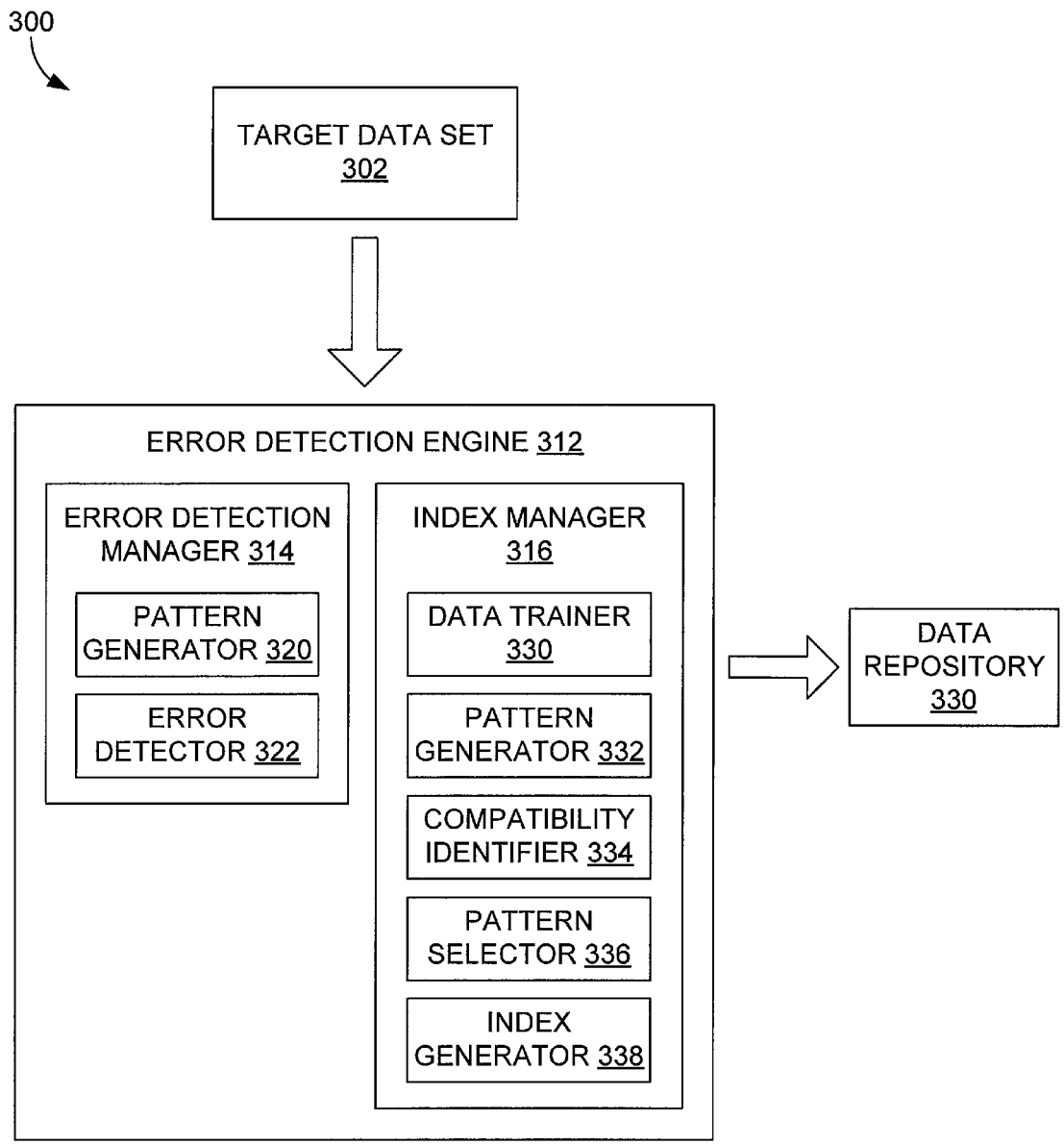
FIG. 3 is an example error detection engine in accordance with aspects of the technology described herein.

Turning now to FIG. 3, FIG. 3 illustrates an example error detection engine 312. In embodiments, the error detection engine 312 includes an error detection manager 314 and an index manager 316. According to embodiments of the invention, the error detection engine 312 can include any number of other components not illustrated. In some embodiments, one or more of the illustrated components 314 and 316 can be integrated into a single component or can be divided into a number of different components. Components 314 and 316 can be implemented on any number of machines and can be integrated, as desired, with any number of other functionalities or services. By way of example only, index manager 316 may operate at a server, while error detection manager 314, or aspects thereof, may operate at a user device.

The error detection engine 312 can communicate with the data repository 318. The data repository 318 is configured to store various types of information used by the error detection engine 312. In embodiments, the error detection engine 312 provides data to the data repository 318 for storage, which may be retrieved or referenced by the error detection engine 312. Examples of types of information stored in data repository 318 may include, for example, data tables, data columns, generalization languages, patterns, compatibility indicators, or the like.

The error detection manager 314 is generally configured to facilitate error detection within a data set, such as a target data set. As shown in FIG. 3, the error detection manager 314 may include a pattern generator 320 and an error detector 322. In implementation, the error detection manager 314 can receive as input a target data set 302 for which error detection is desired. As previously described, such a target data set can be selected by a user via a user device or automatically selected. By way of example only, a user may select a column of data as target data for which error detection is desired. As another example, upon launching a spreadsheet or document having a table, one or more target data sets may be automatically selected and provided as input for error detection.

Upon obtaining a target data set, such as a set of values within a column, a pattern generator 320 can generate patterns in association with the target data set. A pattern, as used herein, generally refers to a generalized representation of a value. Patterns can be generated for any number of data values in the target data set. For example, in some cases, a pattern might be generated for each data value in the target data set.

In embodiments, a pattern can be generated for a data value in accordance with any number of generalization languages. A generalization language generally refers to method for mapping characters or sets of characters to generate a pattern. As can be appreciated, any number of generalization languages may be utilized to generate patterns. For example, a pattern for a value may be generated for each of a set of generalization languages. In this regard, for a particular value in a target data set, a first generation language may be used to generate a first pattern, and a second generation language may be used to generate a second pattern.

The generalization language or set of generalization languages to utilize for generating patterns may be selected in any number of ways. In some cases, a predetermined set of generalization languages might be utilized to generate patterns for a value. For example, for any data value, a first and second generalization language might be used. As another example, for a particular type of data value, a first and second generalization language might be used, while for another type of data value, a third and fourth generalization language might be used. As described in more detail below, a particular set of generalization languages to use to generate patterns can be selected, determined, or identified based on data compatibility associated with training data.

Figure 4:
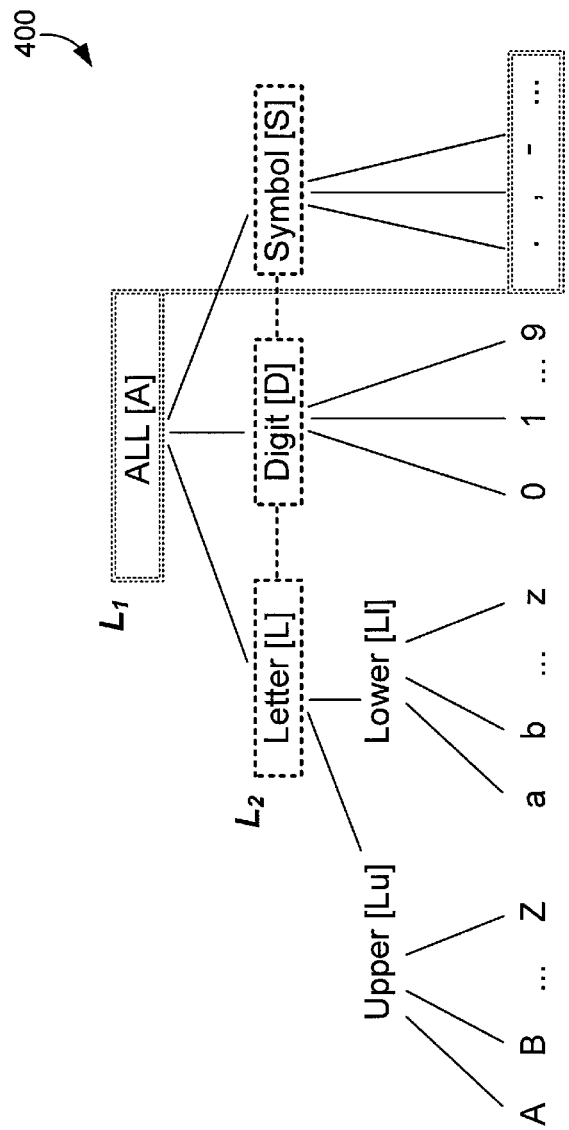
FIG. 4 is an example of a hierarchical generalization tree, in accordance with aspects of the technology described herein.

Generalization languages that might be used to generate patterns may be represented and/or identified via a generalization tree. For example, given an English alphabet $\Sigma=\{\alpha\}$, FIG. 4 provides one example of a hierarchical generalization tree. In particular, a tree H represents a generalization tree defined over an alphabet $\Sigma$, if each of its leaf nodes corresponds to a character $\alpha \in \Sigma$, and each of its intermediate nodes represents the union of all characters in its children nodes. While only one canonical generalization tree is shown in FIG. 4, there are a variety of ways to generalize a given value v using one generalization tree as different characters can be generalized into different combinations of internal tree nodes. Each distinct generalization can be identified or designated as a generalization language that maps each character to a tree node. In this regard, given a value $v=\alpha1\alpha2 \ldots \alpha t$ and a generalization language L, the value v can be generalized to a pattern by applying the mapping of the generalization language on each character of the value v to produce: $L(v)=L(\alpha1)L(\alpha2) \ldots L(\alpha t)$.

By way of example only, assume two generalization languages $L_1$ and $L_2$ are used to generate a pattern. As shown in FIG. 4, assume $L_1$ corresponds with the first level of the hierarchy, and $L_2$ corresponds with the second level of the hierarchy. Such generalization languages can be represented as:

$$L_1(\alpha) = \begin{cases} \alpha, & \text{if } \alpha \text{ is a symbol} \\ \backslash A, & \text{otherwise} \end{cases}$$

$$L_2(\alpha) = \begin{cases} \backslash L, & \text{if } \alpha \in \{a, \ldots, z, A, \ldots, Z\} \\ \backslash D, & \text{if } \alpha \in \{0, \ldots, 9\} \\ \backslash S, & \text{if } \alpha \text{ is a symbol} \end{cases}$$

Now assume two values exist in the same column of data, such as $v_1$="2011-01001" and $v_2$="2011.01.02." Using the generalization language $L_1$ and $L_2$, the following patterns can be generated, respectively:

$L_1(v_1)$="\A[4]-\A[2]-\A[2]"

$L_1(v_2)$="\A[4]·\A[2]·\A[2]"

$L_2(v_1)$="\D[4]\S\D[2]"

$L_2(v_2)$="\D[4]\S\D[2]"

wherein, for example, "\A[4]" denotes four consecutive "\A."

As can be appreciated, various generalization languages may be desirable for utilizing to generate patterns as the resulting patterns can provide varying coverage of compatibility. For instance, with some types of data values, one generalization language may result in a pattern that detects incompatibility of data, while another generalization language may result in a pattern that detects incompatibility of data. In some cases, multiple generalization languages may be complementary in their coverage such that a set of generalization languages may be desired.

By way of example only, and with reference to the example patterns provided above, a compatibility indicator associated with the two patterns for the first generalization language $L_1$ may indicate that the two patterns $L_1(v_1)$ and $L_1(v_2)$ rarely co-occur in a column and, as such, are incompatible. On the other hand, the two patterns for the second generalization language $L_2$ are indistinguishable, making the second generalization language $L_2$ ineffective to detect incompatibility between the two patterns.

As another example, consider another pair of values, $v_3$="2014-01" and $v_4$="July-01." Using generalization language $L_1$, $L_1(v_3)=L_1(v_4)$="\A[4]-\A[2]," which would not detect a data error. In comparison, generalization language $L_2$ produces $L_2(v_3)$="\D[4]\S\D[2]" and $L_2(v_4)$="\L[4]\S\D[2]," having a compatibility indicator that indicates these two patterns are incompatible. As such, in this example, the second generalization language $L_2$ is more effective in detecting incompatibility between the two patterns.

An error detector 322 is generally configured to detect error or incompatibility within a target data set utilizing generated patterns. In particular, the error detector 322 can access a compatibility index that indicates data compatibility and identify whether corresponding data patterns are indicated as compatible or incompatible. To do so, the error detector 322 may generate pairs of patterns for determining compatibility. In such a case, any number of pattern pairs or data pairs may be generated. For example, in some embodiments, pattern pairs can be generated for each combination of values and/or patterns in the target data set. Although described herein as the error detector 322 generating pattern pairs, pattern pairs can be generated by another component, such as, for example by a pattern generator prior to generating patterns or following pattern generation.

As can be appreciated, pattern pairs can be generated for each generalization language used to generate patterns for data values. In this regard, assume a data value pair includes a first value and a second value. In such a case, a first generalization language can be used to generate a first pattern for the first value and a second pattern for the second value. Similarly, a second generalization language can be used to generate a third pattern for the first value and a fourth pattern for the second value. In such a case, a first pattern pair associated with the first generalization language may be generated, and a second pattern pair associated with the second generalization language may be generated.

Upon determining pattern pairs, the pattern pairs can be used to lookup or identify a corresponding training pattern pair. For instance, assume a pattern pair is $<P_1, P_2>$. In such a case, a compatibility index may be referenced and used to identify a matching training pattern pair $<P_1, P_2>$ included therein. As can be appreciated, any number of methods can be used to identify and/or lookup a matching pattern pair.

As multiple pattern pairs for a value pair may be generated in association with varying generalization languages, in embodiments, a training pattern pair associated with a same generalization language as the target pattern pair may be identified. That is, assume a pattern pair associated with a first generalization language is generated from the target data set. In such a case, a training pattern pair corresponding with the same first generalization language may be searched for in the compatibility index.

In accordance with identifying a matching training pattern pair, a compatibility indicator associated therewith can be identified. As described, a compatibility indicator provides an indication of compatibility and/or incapability between two patterns. In the regard, a compatibility indicator may indicate a likelihood or frequency of the existence of two patterns in a data set, such as a column. In some cases, a compatibility that exceeds a threshold may indicate that two patterns are compatible with one another, and a compatibility that is lower than the threshold can indicate that the two patterns are incompatible with one another. For example, in some cases, a threshold may be a 0 value, such that compatibility scores above 0 indicate compatibility between patterns, while compatibility scores below 0 indicate incompatibility between patterns. As discussed, two patterns that are indicated as incompatible with one another can indicate a data error.

A compatibility indicator can be determined in any number of ways for training pattern pairs. As one example, a compatibility indicator may be determined using a statistical measure referred to as point-wise mutual information, or PMI. In particular, a pair-wise NPMI score ($s_k$) can be determined for a pattern pair for a language:

$$s_k(v_i,v_j)=\text{NPMI}(L_k(v_i),L_k(v_j))$$

An example for determining PMI and NPMI is provided herein in relation to value pairs for purposes of illustration, however, PMI and/or NMPI as described herein can additionally or alternatively be determined in association with pattern pairs in a similar manner. Let $c(v)=|\{C|C \in C, v \in C\}|$ be the number of columns with value v, and $c(v_1,v_2)=|\{C|C \in C, v_1 \in C, v_2 \in C\}|$ be the number of columns with both $v_1$ and $v_2$. The probability of seeing the value v in a column can be defined as $$p(v) = \frac{c(v)}{|C|},$$

and the probability of seeing both $v_1$ and $v_2$ in the same column can be defined as $$p(v_1, v_2) = \frac{c(v_1, v_2)}{|C|}.$$

PMI can then be defined as:

$$PMI(v_1, v_2) = \log \frac{p(v_1, v_2)}{p(v_1)p(v_2)}$$

Generally, if $v_1$ and $v_2$ co-occur completely by random chances, then $p(v_1,v_2)=p(v_1)p(v_2)$, and thus $p(v_1, v_2)/p(v_1)p(v_2)=1$, making $PMI(v_1, v_2)=0$, thereby indicating no statistical correlation. If $v_1$ and $v_2$ are positively correlated and co-occur more often, then $PMI(v_1, v_2)>0$; otherwise $PMI(v_1, v_2)<0$. PMI can be normalized into [−1, 1] using Normalized PMI (NPMI), defined as $$NPMI(v_1, v_2) = \frac{PMI(v_1, v_2)}{-\log\ p(v_1, v_2)}$$

By way of example only, assume $v_1$="2011", and $v_2$="2012". Further assume that $|C|$=100M columns in the corpus, and $c(v_1)$=1M, $c(v_2)$=2M, $c(v_1, v_2)$=500K, respectively. In such a case, the following probabilities can be computed $p(v_1)$=0.01, $p(v_2)$=0.02, and $p(v_1, v_2)$=0.005, from which $NPMI(v_1, v_2)$=0.60>0 can be calculated, indicating a strong statistical co-occurrence. This suggests that the two values are highly compatible in the same columns. As another example, assume $v_1$="2011", and $v_3$="January-01". In such a case, NPMI ($v_1, v_3$) can be determined to be −0.47<0 because $v_1$, $v_3$ rarely co-occur with $c(v_1)$=1M, $c(v_3)$=2M, and $c(v_1, v_3)$=10, suggesting that this pair of values is incompatible.

As described, in some cases, multiple pattern pairs may be generated for a pair of values based on utilization of multiple generalization languages. By way of example only, assume two data values "2011-01-01" and "2011.01.02" are converted to a first pattern pair via a first generalization language and converted to a second pattern pair via a second generalization language. Now assume the compatibility index is searched for both the first pattern pair in association with the first generalization language and the second pattern pair in association with the second generalization language. In such a case, a first compatibility indicator and a second compatibility indicator can be identified for the two data values "2011-01-01" and "2011.01.02." Such varying compatibility indicators can be analyzed in any number of ways to identify a final compatibility indicator for the data value pair.

By way of example only, in some implementations, the various compatibility indicators may be aggregated, for example, by determining an average compatibility indicator score. As can be appreciated, in some cases, an average compatibility indicator may not be optimal as different languages generalize values differently. For example, the value pair "2011-01-01" and "2011.01.02" might only be detected using a first generalization language, while another value pair, such as "2014-01" and "July-01" might only be detected using a second generalization language. In another implementation, observing the complementarity of generalization languages (e.g., $L_1$ and $L_2$), one approach is to use each language, but predict a pair of values as incompatible when at least one language is confident (producing a low $s_k(v_i,v_j)$ score), and ignore languages that are not confident (with high NPMI scores), because each generalization language may result in values that are difficult to differentiate. For instance, for a set of languages, if one language predicts two values are not compatible (e.g., less than a threshold), overall the two values are predicted as incompatible, regardless of predictions produced in association with other languages.

Based on an indication of compatibility for a pattern pair and/or value pair, an indication of the compatibility between the two patterns or values associated therewith, can be stored or provided to another component, such as a server or user device. In instances when provided to a user device, a user may view the compatibility indicator(s) and decide whether the data is indeed incompatible or erroneous. In additional or alternative embodiments, the indication of compatibility can be used to generate an indication of an erroneous value, a data modification and/or a data removal. For example, upon determining a pair of values are incompatible, a determination of a specific erroneous value may be made as well as a recommendation to remove the erroneous value or a recommendation for a data correction (e.g., transform the data value into a different format) may be provided.

As generally described, a compatibility index is referenced and utilized to detect data error, or data incompatibility. As such, the index manager 316 is configured to generate and manage the compatibility index. As described, a compatibility index generally refers to an index or data structure that includes compatibility indicators indicating compatibility between two patterns and/or values (also referred to herein as pattern pairs and value pairs). In accordance with embodiments described herein, compatibility indicators within an index are generally generated based on compatibility of patterns and/or values in historical data, that is, existing data. In this manner, existing data from various data sources (e.g., external data sources, web data sources, etc.) can be analyzed to identify whether such data is compatible with one another. As such, incompatibility or error detection can be based on a more global collection of data as opposed to restricting error detection to other data included in the data set being analyzed.

To generate a compatibility index, index manager 316 may include a data trainer 330, a pattern generator 332, a compatibility identifier 334, a pattern selector 336, and an index generator 338. To generate a compatibility index for use in detecting erroneous data, a training corpus can be generated. A data trainer 330 is generally configured to generate a training data corpus.

To generate a training data corpus, the data trainer 330 may initially obtain or access existing data, for example, via the Internet and/or within an Enterprise. For instance, a corpus with over 100 million web tables can be extracted from a web page index of a search engine. As data error detection is generally described herein as being detected within a single data set, such as a single column, tables can be decomposed into individual data sets, or columns.

In embodiments, sets of data, such as columns, having values that are verified to be statistically compatible can be selected. By way of example only, given a set of columns C, a set of columns C$^+$ can be selected having values that are verified to be statistically compatible. In this regard, the initial data can be analyzed to remove data sets (e.g., columns of data) that do not have statistically compatible data. To determine statistical compatibility, NPMI scores can be determined and used to verify statistical compatibility. As such, co-occurrence and PMI or NMPI scores can be calculated for all data pair variations. In this way, data within existing data sets can be verified as compatible to one another.

Such data sets with statistically compatible data can then be used to generate training examples. Training examples generally refer to pairs of data values that include compatible data or incompatible data. As compatibility is verified within a data set, pairs of data values within a single data set (e.g., column) can be used to generate compatible pairs of data. For example, assume a data set includes A, B, and C. In such a case, value pairs may include (A, B), (A, C), and (B, C). Any number of pairs of data values from within a data set can be utilized to generate compatible pairs of data.

To generate incompatible pairs of data, a value within a data set can be mixed with values in another data set (e.g., column) to produce a synthetic data set (e.g., column). In such a case, it is likely that the synthetic data set will include a sole value that is incompatible with the other values in the data set. As such, the incompatible value can be paired with each of the other values to generate incompatible value pairs. As can be appreciated, such incompatibility can be verified for example, by comparing the implanted value with the other values. As such, a set of compatible pairs of data and a set of incompatible pairs of data are generated as a training set of data included in the training data corpus.

The pattern generator 332 is generally configured to generate patterns in association with data values. In this regard, upon obtaining a training data corpus having compatible value pairs and incompatible value pairs, the pattern generator 332 can generate patterns for the value pairs. The pattern generator 332 can generate patterns for each value in association with any number of generalization languages.

As can be appreciated, any number of generalization languages may be utilized to generate patterns. For example, a pattern for a value may be generated for each of a set of generalization languages. In this regard, for a particular value pair, a first generation language may be used to generate a first pattern pair (that corresponds with the value pair), and a second generation language may be used to generate a second pattern pair (that corresponds with the value pair).

The generalization language or set of generalization languages to utilize for generating patterns may be selected in any number of ways. In some cases, a predetermined set of generalization languages might be utilized to generate patterns for a value. For example, each generalization language (e.g., in a generalization tree), might be used. Generalization languages that might be used to generate patterns may be represented and/or identified via a generalization tree. By way of example only, assume two generalization languages $L_1$ and $L_2$ are used to generate a pattern. As shown in FIG. 4, assume $L_1$ corresponds with the first level of the hierarchy, and $L_2$ corresponds with the second level of the hierarchy. Such generalization languages can be represented as:

$$L_1(\alpha) = \begin{cases} \alpha, \text{if } \alpha \text{ is a symbol} \\ \backslash A, \text{otherwise} \end{cases}$$

$$L_2(\alpha) = \begin{cases} \backslash L, \text{if } \alpha \in \{\alpha, ..., z, A, ..., Z\} \\ \backslash D, \text{if } \alpha \in \{0, ..., 9\} \\ \backslash S, \text{if } \alpha \text{ is a symbol} \end{cases}$$

Now assume two values exist in the same column of data, such as $v_1$="2011-01001" and $v_2$="2011.01.02." Using the generalization language $L_1$ and $L_2$, the following patterns can be generated, respectively:

$L_1(v_1)$="\A[4]-\A[2]-\A[2]"

$L_1(v_2)$="\A[4]·\A[2]·\A[2]"

$L_2(v_1)$="\D[4]\S\D[2]"

$L_2(v_2)$="\D[4]\S\D[2]"

wherein, for example, "\A[4]" denotes four consecutive "\A."

As can be appreciated, various generalization languages may be desirable for utilizing to generate patterns as the resulting patterns can provide varying coverage of compatibility. For instance, with some types of data values, one generalization language may result in a pattern that detects incompatibility of data, while another generalization language may result in a pattern that detects incompatibility of data. In some cases, multiple generalization languages may be complementary in their coverage such that a set of generalization languages may be desired.

By way of example only, and with reference to the example patterns provided above, a compatibility indicator associated with the two patterns for the first generalization language $L_1$ may indicate that the two patterns $L_1(v_1)$ and $L_1(v_2)$ rarely co-occur in a column and, as such, are incompatible. On the other hand, the two patterns for the second generalization language $L_2$ are indistinguishable, making the second generalization language $L_2$ ineffective to detect incompatibility between the two patterns.

As another example, consider another pair of values, $v_3$="2014-01" and $v_4$="July-01." Using generalization language $L_1$, $L_1(v_3)=L_1(v_4)$="\A[4]-\A[2]," which would not detect a data error. In comparison, generalization language $L_2$ produces $L_2(v_3)$="\D[4]\S\D[2]" and $L_2(v_4)$="\L[4]\S\D[2]," having a compatibility indicator that indicates these two patterns are incompatible. As such, in this example, the second generalization language $L_2$ is more effective in detecting incompatibility between the two patterns.

Although generally described herein as identifying compatible training examples and incompatible training examples and then identify patterns for the pairs, as can be appreciated, in other embodiments, patterns can be identified for values and then joined into pairs.

The compatibility identifier 334 is generally configured to identify compatibility between pattern pairs and/or value pairs. In this regard, for a pattern pair generated in association with a particular generalization language, the compatibility identifier 334 can identify compatibility between the two patterns, or values associated therewith.

In accordance with identifying a pattern pair (a pair of patterns generated from a pair of values in association with a generalization language), a compatibility associated therewith can be identified. As described, a compatibility indicator provides an indication of compatibility and/or incompatibility between two patterns and/or corresponding values. In some cases, a compatibility that exceeds a threshold may indicate that two patterns and/or values are compatible with one another, and a compatibility score that is lower than the threshold can indicate that the two patterns and/or values are incompatible with one another. For example, in some cases, a threshold may be a 0 value, such that compatibility scores above 0 indicate compatibility between patterns and/or corresponding values, while compatibility scores below 0 indicate incompatibility between the patterns and/or corresponding values. As discussed, two patterns and/or values that are indicated as incompatible with one another can indicate a data error.

A compatibility score or indicator can be generated in any number of ways. As one example, as described above, a compatibility indicator may be determined using a statistical measure referred to as point-wise mutual information, or PMI. In particular, a pair-wise NPMI score ($s_k$) can be determined for a pattern pair for a language:

$$s_k(v_i, v_j) = \text{NPMI}(L_k(v_i), L_k(v_j))$$

An example for determining PMI and NPMI is provided herein in relation to value pairs for purposes of illustration, however, PMI and/or NMPI as described herein can additionally or alternatively be determined in association with pattern pairs. Let $c(v) = |\{C | C \in \mathbf{C}, v \in C\}|$ be the number of columns with value v, and $c(v_1, v_2) = |\{C | C \in \mathbf{C}, v1 \in C, v2 \in C\}|$ be the number of columns with both $v_1$ and $v_2$. The probability of seeing the value v in a column can be defined as $$p(v) = \frac{c(v)}{|\mathbf{C}|},$$

and the probability of seeing both $v_1$ and $v_2$ in the same column can be defined as $$p(v_1, v_2) = \frac{c(v_1, v_2)}{|\mathbf{C}|}.$$

PMI can then be defined as:

$$PMI(v_1, v_2) = \log \frac{p(v_1, v_2)}{p(v_1) p(v_2)}$$

Generally, if $v_1$ and $v_2$ co-occur completely by random chances, then $p(v_1, v_2) = p(v_1) p(v_2)$, and thus $p(v_1, v_2)/p(v_1)p(v_2) = 1$, making $PMI(v_1, v_2) = 0$, thereby indicating no statistical correlation. If $v_1$ and $v_2$ are positively correlated and co-occur more often, then $PMI(v_1, v_2) > 0$; otherwise $PMI(v_1, v_2) < 0$. PMI can be normalized into $[-1, 1]$ using Normalized PMI (NPMI), defined as $$NPMI(v_1, v_2) = \frac{PMI(v_1, v_2)}{-\log p(v_1, v_2)}$$

By way of example only, assume $v_1$="2011", and $v_2$="2012". Further assume that $|\mathbf{C}|=100M$ columns in the corpus, and $c(v_1)=1M$, $c(v_2)=2M$, $c(v_1, v_2)=500K$, respectively. In such a case, the following probabilities can be computed $p(v_1)=0.01$, $p(v_2)=0.02$, and $p(v_1, v_2)=0.005$, from which $NPMI(v_1, v_2)=0.60>0$ can be calculated, indicating a strong statistical co-occurrence. This suggests that the two values are highly compatible in the same columns. As another example, assume $v_1$="2011", and $v_3$="January-01". In such a case, NPMI $(v_1, v_3)$ can be determined to be $-0.47<0$ because $v_1$, $v_3$ rarely co-occur with $c(v_1)=1M$, $c(v_3)=2M$, and $c(v_1, v_3)=10$, suggesting that this pair of values is incompatible.

Generally, computing NPMI as the compatibility of two patterns $L(v_1)$ and $L(v_2)$ is reliable, particularly when enough data exists with large occurrence count of $c(L(v_1))$ and $c(L(v_2))$. However, due to data sparsity, in some cases $c(L(v_1))$, $c(L(v_2))$ and $c(L(v_1), L(v_2))$ all $\rightarrow 0$. In such case, NPMI scores might fluctuate substantially with small changes of $c(L(v_1), L(v_2))$. Accordingly, in one embodiment, co-occurrence counts can be smoothed out using a technique known as smoothing. For instance, Jelinek-Mercer smoothing can be utilized. Jelinek-Mercer computes a weighted sum of the observed $c(L(v_1), L(v_2))$ and its expectation assuming independence $$E(L(v_1), L(v_2)) = \frac{c(p_1) \cdot c(p_2)}{N},$$

where N is the total number of columns.

$$\hat{c}(L(v_1), L(v_2)) = (1-f) \cdot c(L(v_1), L(v_2)) + f \cdot E(L(v_1), L(v_2))$$

where f is the smoothing factor between 0 and 1.

As previously discussed, for each language L, in order to compute NPMI between two patterns $L(v_1)$, $L(v_2)$, two types of statistics are used and may be stored in memory: (1) the occurrence count of pattern $L(v_1)$ and $L(v_2)$ in C, respectively, and (2) the co-occurrence count of $L(v_1)$ and $L(v_2)$ in same columns in C. Typically, storing co-occurrence counts in (2) for all pairs with non-zero values as dictionary entries $(L(v_1), L(v_2)) \rightarrow Cnt_{12})$ can be expensive, because for many candidate languages there exist hundreds of millions of such pairs. Storing these co-occurrence counts as dictionaries for each language can require hundreds of MB and multiple GB. As such, to further optimize the memory requirement, a probabilistic counting method called count-min (CM) sketch can be used.

Generally, CM sketches maintain a two dimensional array M with w columns and d rows (where wd is substantially smaller than the total number of items for space reduction). Each row $i \in [w]$ is associated with a hash function $h_i$ from a family of pairwise independent H. When a key-value pair (k,v) arrives, the entry at row i, column position $h_i(k)$, written as $M[i, h_i(k)]$, can be incremented by v, for all row $i \in [w]$. At query time, the estimated value for a given key k is $\hat{v}(k) = \min_i M[i, h_i(k)]$. It can be shown that by setting $w = \lceil e/\epsilon \rceil$ and $d = \lceil \ln 1/\delta \rceil$, it can be guaranteed that $\hat{v}(k) \leq v(k) + \epsilon N$ with probability $1-\delta$, where $N = \Sigma_{k \in K} v(k)$ is the total item values. In other words, with high probability $\hat{v}(k)$ will not overestimate its true value $v(k)$ by too much. Applying CM sketches to compress co-occurrence can reduce memory sizes used by a generalization language, often by orders of magnitude (e.g., from 4 GB to 40 MB), without much impact on counting accuracy or precision/recall loss in error detection.

A pattern selector 336 is generally configured to select a set of generalization languages for which to include in the compatibility index. As described, different generalization languages can have different advantages for detecting different types of incompatibility. One candidate language is to encode everything at the leaf level, which amounts to no generalization. Such a language is more sensitive in detecting issues, but can also lead to false-positives (e.g., detecting "1918-01-01" and "2018-12-31" as incompatible) due to data sparsity. On the other hand, generalizing everything to the root can result in a pattern that is too insensitive to detect any issues. As such, the pattern selector 336 can be configured to select generalization languages with an appropriate balance in the hierarchy (which is generally determined based on the amount of training corpus—the sparser the data, the more need to generalize).

Further, generalization languages can be advantageously selected due to space capacity as different languages require different amounts of space. For example, the most detailed generalization language at the leaf level, for example, can require over 100 GB of memory for co-occurrence statistics, and with more generalizations higher up in the hierarchy, the less space is required. In some cases, error detection is an interactive process on user devices, and as such, the co-occurrence statistics may be memory-resident. From the tree in FIG. 4, 452310333 (6×1051) possible generalization languages may result. In practice, although restrictions can be imposed to require classes of characters like [A-Z] to generalize to the same level, 144 candidate languages can still exist. As discussed, these generalization languages take different amounts of spaces, have different precision/recall tradeoffs, and can be partially redundant or complementary to each other. As such, the pattern selector 336 can analyze data and select a best subset of languages from a set of all languages to use for error detection. In this way, a smaller amount of data can be stored in the compatibility index.

One method for selecting a subset of languages includes utilizing dynamic-threshold (DT) aggregation. Using dynamic-threshold (DT) aggregation, a dynamic threshold $\vec{\theta}_k$ can be effectively selected for each generalization language $L_k$, and cases below the threshold can be predicted as being incompatible. This can be denoted as:

$$H_k(T, \vec{\theta}_k) = \{(v_i, v_j) | (v_i, v_j) \in T, s_k(v_i, v_j) \leq \vec{\theta}_k\}$$

enabling, for each generalization language, trusting of confident predictions and ignoring the less confident predictions. $H_k(T^+, \vec{\theta}_k)$ and $H_k(T^-, \vec{\theta}_k)$ can be defined similarly. One method to aggregate results $H_k$ across all generalization languages is to union the results as a confident prediction from one generalization language alone can be enough. For a given set of generalization languages L' and their associated thresholds, precision and recall can be calculated using the labels in T, as $$P(L', \vec{\theta}) = \frac{\left| \bigcup_{L_k \in L'} H_k(T^-, \vec{\theta}_k) \right|}{\left| \bigcup_{L_k \in L'} H_k(T, \vec{\theta}_k) \right|}$$

$$R(L', \vec{\theta}) = \frac{\left| \bigcup_{L_k \in L'} H_k(T^-, \vec{\theta}_k) \right|}{|T^-|}$$

Another method for selecting a subset of languages includes utilizing static-threshold (DT) aggregation. Instead of allowing each generalization language $L_k \in L'$ to pick a separate threshold, while optimizing the union of the predictions in L' to maximize recall while maintaining a precision P, each language $L_k \in L'$ can be required to be of at least precision P on T. This is equivalent to finding a $\vec{\theta}_k$ such that:

$$P_k(\vec{\theta}_k) = \frac{|H_k(T^-, \vec{\theta}_k)|}{|H_k(T, \vec{\theta}_k)|} \geq P$$

Note that because labeled examples are generated, given a precision requirement P, $\vec{\theta}_k$ can be statically computed for each language $L_k$:

$$\text{argmax } \vec{\theta}_k, s.t. P_k(\theta') \geq P, \forall \theta' < \vec{\theta}_k$$

Because for a fixed P, $\vec{\theta}_k$ can be uniquely determined, $H_k(T^-, \vec{\theta}_k)$ can be written as $H_k^-$ for short to denote the set of incompatible examples covered by $L_k$ (and likewise $H_k^+$), when the context of P is clear.

By way of example only, and with reference to Tables 1 and 2 below, Table 1 shows an example T, where $T^+ = \{t_1^+, \ldots t_5^+\}$ (compatible examples) and $T^- = \{t_6^-, \ldots t_{10}^-\}$ (incompatible examples). Each $t_i$ corresponds to a pair of cell values, defined as $t_i^+ = (u_i, v_i, +)$, $t_i^- = (u_i, v_i, -)$.

TABLE 1

Generated training examples, where $t_i^+ = (u_i, v_i, +)$, $t_i^- = (u_i, v_i, -)$.
Scores are provided based on NPMI from generalization using $L_j$.

|  | T+ | | | | | T− | | | | |
| --- | --- | --- | --- | --- | --- | --- | --- | --- | --- | --- |
|  | $t_1^+$ | $t_2^+$ | $t_3^+$ | $t_4^+$ | $t_5^+$ | $t_6^-$ | $t_7^-$ | $t_8^-$ | $t_9^-$ | $t_{10}^-$ |
| $L_1$ | 0.5 | 0.5 | −0.7 | 0.4 | 0.5 | −0.5 | 0.9 | −0.6 | −0.7 | 0.2 |
| $L_2$ | 0.5 | 0.5 | 0.4 | −0.8 | 0.5 | 0.9 | −0.6 | 0.2 | −0.7 | −0.7 |
| $L_3$ | 0.4 | 0.5 | 0.5 | 0.6 | 0.5 | −0.6 | −0.6 | −0.7 | −0.5 | 0.9 |

Now assume a precision requirement P=0.75 is given. Based on the above equation, we can get $\vec{\theta}_1 = -0.5$ where the precision is:

$$P_1(\vec{\theta}_1) = \frac{|H_1^+|}{|H_1^+| + |H_1^-|} = \frac{3}{4} = 0.75$$

Similarly, $\vec{\theta}_2$ and $\vec{\theta}_3$ can be computed as −0.6 and −0.5, respectively, as shown in Table 2.

TABLE 2

Example of language selection

|  | size | $\theta_k$ | $H_k^-$ | $H_k^+$ | $P_k$ |
| --- | --- | --- | --- | --- | --- |
| $L_1$ | 200 MB | −0.5 | $\{t_6^-, t_8^-, t_9^-\}$ | $\{t_3^+\}$ | 0.75 |
| $L_2$ | 300 MB | −0.6 | $\{t_7^-, t_9^-, t_{10}^-\}$ | $\{t_4^+\}$ | 0.75 |
| $L_3$ | 400 MB | −0.5 | $\{t_6^-, t_7^-, t_8^-, t_9^-\}$ | ∅ | 1.0 |

Now that $\vec{\theta}_k$ are uniquely determined, the optimization question becomes select a subset $L' \subset L$ to maximize the coverage of incompatibility cases in T.

In this regard, given a corpus of table columns C, a generalization tree H, and a set of candidate languages L induced by H, a subset of languages can be selected $L' = \{L_k\} \subset L$, where each $L_k$ has a precision requirement of P, such that the union can detect as many single-column compatibility errors as possible on the training set T, subject to a memory budget of M. Stated differently, a subset of languages can be selected by:

$$\text{maximize}_{L' \subset L} R(L', \vec{\theta})$$
$$\text{s.t.} \sum_{L_i \in L'} \text{size}(L_i) \leq M$$
$$P_k(\vec{\theta}_k) \geq P$$

In some embodiments, a greedy approach may be used to iteratively find a generalization language from a candidate set of generalization languages $L_C$. One such algorithm is provided as follows:

Algorithm 1 Greedy algorithm for Auto-Detect

1: $G \leftarrow \emptyset$, curr_size $\leftarrow 0$, $L_C \leftarrow L$

2: while $L_C \neq \emptyset$ do

3:     $L'_C \leftarrow \{L \mid L \in L_C, \text{size}(L) + \text{curr\_size} \leq M\}$ 4:     $L^* \leftarrow \text{argmax}_{L_i \in L'_C} \frac{\left|\bigcup_{L_j \in G} H_j^- \cup H_i^-\right| - \left|\bigcup_{L_j \in G} H_j^-\right|}{\text{size}(L_i)}$ 5:     $G \leftarrow G \cup \{L^*\}$ 6:     curr_size $\leftarrow$ curr_size + size($L^*$)

7:     $L_C \leftarrow L'_C - L^*$

8: $L_k \leftarrow \text{argmax}_{L_i \in L, \text{size}(L_i) \leq M} |H_i^-|$

9: if $\left|\bigcup_{L_j \in G} H_j^-\right| \geq |H_k^-|$ then

10:     return $G$

11: else

12:     return $\{L_k\}$

In this example, the first portion of this algorithm (lines 2-7) iteratively find a language L from the candidate set, whose addition into the current selected set of candidate language G will result in the largest incremental gain, defined as the coverage of new incompatibility cases divided by language size, which can be written as:

$$L^* = \text{argmax}_{L_i \in L'_C} \frac{\left|\bigcup_{L_j \in G} H_j^- \cup H_i^-\right| - \left|\bigcup_{L_j \in G} H_j^-\right|}{\text{size}(L_i)}$$

The candidate set can be iteratively expanded until no further generalization language candidates can be found without violating memory constraints. Additionally, a best single language can be computed: $L_k$=argmax$_{L_i \in L, \text{size}(L_i) \leq M} |H_i^-|$ (line 8). The coverage of $L_k$ and G can be compared, and used to select the better option as the selected L' (line 9-12).

By way of example only, and with reference to Table 2 (above), assume a memory size constraint M=500 MB and precision requirement P=0.75 are desired. Thresholds $\vec{\theta}_k$ and their coverage $H_k^+$ can be computed. Using Algorithm 1 above, $L_1$ can be initially selected into G because it achieves the largest $$\frac{|H_k^-|}{\text{size}(L_k)}.$$

In the second iteration, only $L_2$ can be selected into G, because $L_3$ is too large in size (200+400>500). Now, G={L1, L2} as the first candidate, and it covers five negative samples in total ($t_1$ to $t_5$). Then, {L3} can be selected as the best singleton, because it alone has the best coverage (4). Finally, two candidate sets can be compared, with candidate set {L1, L2} being output as the final selected languages because such generalization languages outperform {L3}.

In accordance with selecting a subset of generalization languages, the index generator 338 can generate a compatibility index for subsequent use in detecting data errors. A compatibility index may include various types of data. In embodiments, a compatibility index includes a set of pattern pairs and corresponding compatibility indicators. As can be appreciated, pattern pairs generated in association with each selected generalization language can be included in such a compatibility index, or set of indices. For example, assume a first generalization language and second generalization language are identified as optimally being used to detect compatibility. In such a case, pattern pairs and corresponding compatibility indicators associated with the first generalization language and the second generalization language can be included in the compatibility index.

Exemplary Implementations for Facilitating Data Error Detection

Figure 5:
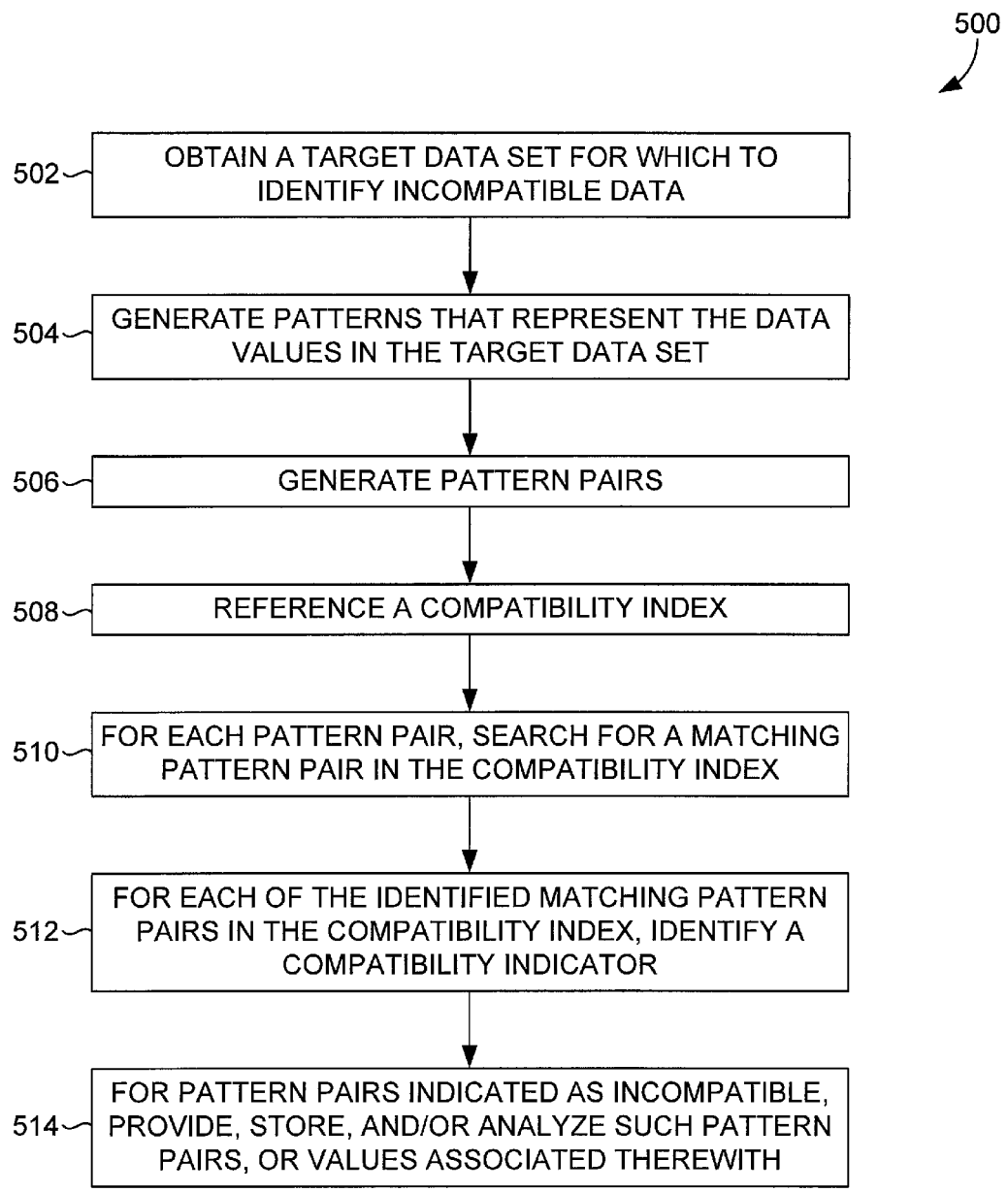
FIG. 5 provides an example method for facilitating detection of data errors, in accordance with aspects of the technology described herein.
Figure 6:
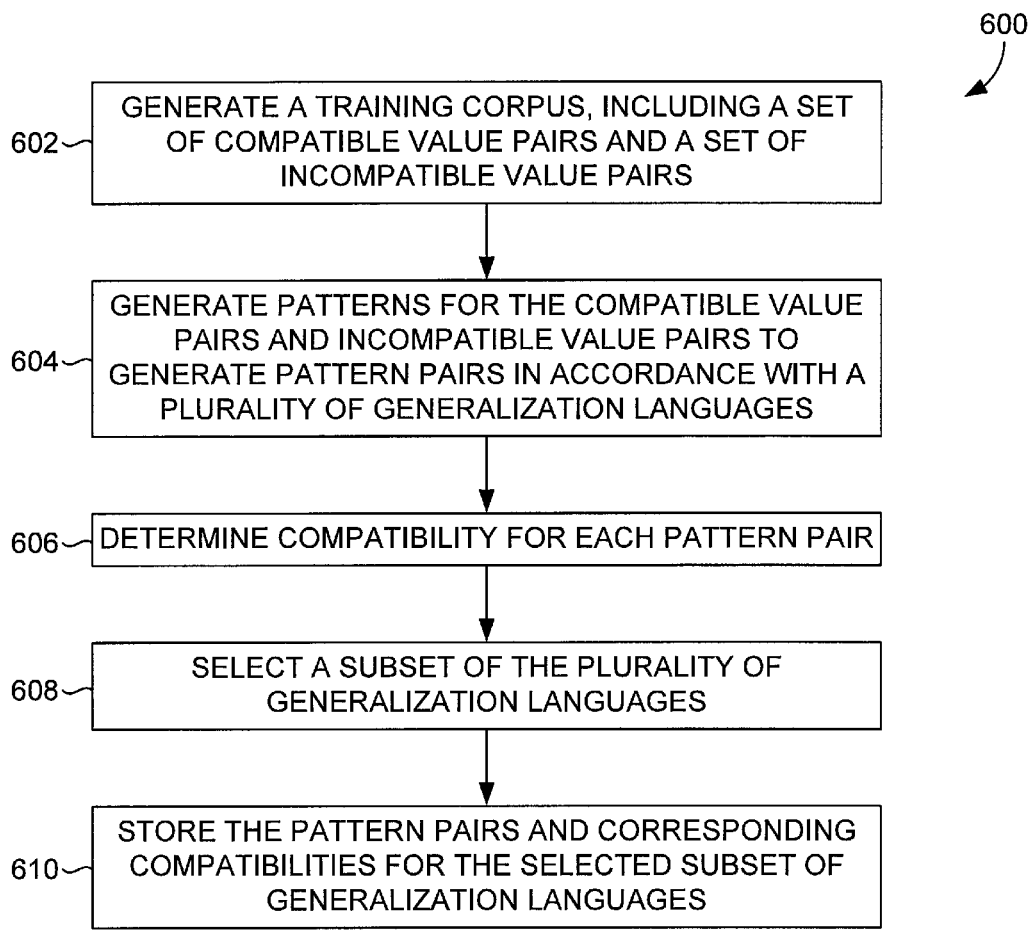
FIG. 6 provides an example method for generating a compatibility index, in accordance with aspects of the technology described herein.

As described, various implementations can be used in accordance with embodiments of the present invention. FIGS. 5-6 provide methods of facilitating data error detection, in accordance with embodiments described herein. The methods 500 and 600 can be performed by a computer device, such as device 700 described below. The flow diagrams represented in FIGS. 5-6 are intended to be exemplary in nature and not limiting.

Turning initially to method 500 of FIG. 5, method 500 is directed to facilitating data error detection, in accordance with embodiments of the present invention. Initially, at block 502, a target data set for which to identify incompatible data is obtained. A target data set may be selected by a user or automatically selected. At block 504, patterns that represent the data values in the target data set are generated. In embodiments, such patterns can be generated in accordance with any number of generalization languages. At block 506, pattern pairs are generated. Each pattern pair includes a pair of patterns that represent a pair of values within the target data set. In some embodiments, pattern pairs can be generated for each combination of values in the data set. At block 508, a compatibility index is referenced. Thereafter, at block 510, for each pattern pair, a matching pattern pair is searched for in the compatibility index. For each of the identified matching pattern pairs in the compatibility index, a compatibility indicator is identified, as indicated at block 512. A compatibility indicator generally indicates whether the patterns are compatible. For pattern pairs indicated as incompatible, such pattern pairs, or values associated therewith, are provided (e.g., to another device), stored, or analyzed. This is indicated at block 514.

With reference to method 600 of FIG. 6, FIG. 6 is directed to generating a compatibility index, in accordance with embodiments of the present invention. Initially, at block 602, a training corpus, including a set of compatible value pairs and a set of incompatible value pairs, is generated. At block 604, patterns are generated for the compatible value pairs and incompatible value pairs to generate pattern pairs in accordance with a plurality of generalization languages. At block 606, compatibility for each pattern pair is determined. As one example, compatibility can be determined using NPMI, as described herein. At block 608, a subset of the plurality of generalization languages is selected. The subset of generalization languages can be selected to reduce the amount of memory required to store data. At block 610, the pattern pairs and corresponding compatibilities for the selected subset of generalization languages are stored in an index.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
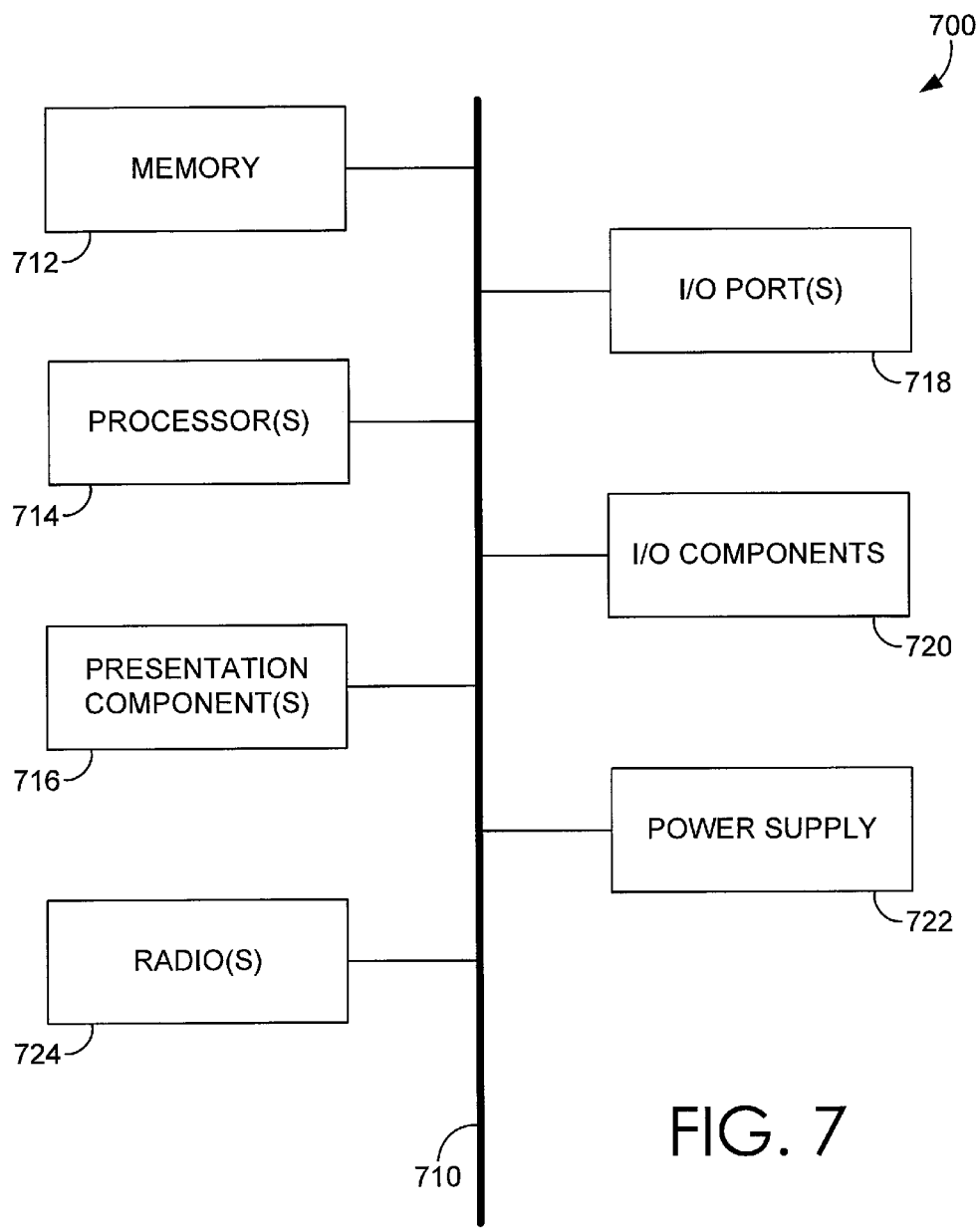
FIG. 7 is a block diagram of an exemplary computing environment suitable for use in implementing aspects of the technology described herein.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal"

means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, vibrating component, etc. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:
a processor; and
computer storage memory having computer-executable instructions stored thereon which, when executed by the processor, configure the computing system to:
obtain a target data set having a plurality of values for which to identify incompatible data;
generate a pattern for each of the plurality of values using at least one generalization language that provides a mapping of characters or sets of characters to generate the pattern;
utilize a pair of patterns that represent a pair of values to identify a compatibility indicator that corresponds with a pair of training patterns in a compatibility index that match the pair of patterns, the compatibility indicator indicating the patterns of the pair of patterns are incompatible with one another based on a statistical analysis performed in association with a corpus of data external to the target data set; and
based on the compatibility indicator indicating the patterns of the pair of patterns are incompatible with one another, remove or modify at least a portion of the pair of values.

2. The computing system of claim 1, wherein the corpus of data external to the target data set includes data tables available on the web.

3. The computing system of claim 1, wherein the target data set is selected by a user.

4. The computing system of claim 1, wherein the target data set is automatically selected.

5. The computing system of claim 1, wherein the at least one generalization language comprises a first generalization language and a second generalization language within a generalization language hierarchy.

6. The computing system of claim 1, wherein the compatibility indicator is generated using normalized pointwise mutual information (NPMI).

7. The computing system of claim 1, wherein the compatibility indicator is generated using co-occur statistics.

8. The computing system of claim 1, wherein the at least one generalization language comprises a set of generalization languages determined to exceed a precision threshold and within a memory constraint.

9. A computer-implemented method for facilitating data error detection, the method comprising:
    generating a training corpus including a set of compatible value pairs and a set of incompatible value pairs;
    generating patterns for the compatible value pairs and incompatible value pairs to generate pattern pairs in accordance with a plurality of generalization languages;
    determining a compatibility score for each pattern pair;
    selecting a subset of the plurality of generalization languages based on a precision threshold and a memory constraint; and
    generating a compatibility index including the pattern pairs and corresponding compatibilities scores for the selected subset of the plurality of generalization languages.

10. The method of claim 9, wherein the training corpus is generated using external data sources.

11. The method of claim 9, wherein a pattern represents a value in a generalized manner.

12. The method of claim 9, wherein the compatibility score is determined using normalized pointwise mutual information (NPMI).

13. The method of claim 9, wherein the compatibility indicator is generated using co-occur statistics.

14. One or more computer storage media having computer-executable instructions embodied thereon that, when executed by one or more processors, cause the one or more processors to perform a method for facilitating error detection, the method comprising:
    obtain a target data set having a plurality of values for which to identify incompatible data;
    generate a pattern for each of the plurality of values using at least one generalization language that provides a mapping of characters or sets of characters to generate the pattern;
    utilize a pair of patterns that represent a pair of values to identify a compatibility indicator that corresponds with a pair of training patterns in a compatibility index that match the pair of patterns, the compatibility indicator indicating the patterns of the pair of patterns are incompatible with one another based on normalized pointwise mutual information (NPMI); and
    based on the compatibility indicator indicating the patterns of the pair of patterns are incompatible with one another, remove or modify at least a portion of the pair of values.

15. The media of claim 14, wherein the corpus of data external to the target data set includes data tables available on the web.

16. The media of claim 14, wherein the target data set is selected by a user.

17. The media of claim 14, wherein the target data set is automatically selected.

* * * * *